(12) United States Patent
Kashima

(10) Patent No.: US 8,233,808 B2
(45) Date of Patent: Jul. 31, 2012

(54) OPTICAL TRANSMISSION SYSTEM USING FOUR-WAVE MIXING

(75) Inventor: Norio Kashima, Tokyo (JP)

(73) Assignees: Fujikura Ltd., Tokyo (JP); Shibaura Institute of Technology, Tokyo (JP)

( * ) Notice: Subject to any disclaimer, the term of this patent is extended or adjusted under 35 U.S.C. 154(b) by 491 days.

(21) Appl. No.: 12/482,722

(22) Filed: Jun. 11, 2009

(65) Prior Publication Data

US 2009/0324230 A1    Dec. 31, 2009

(30) Foreign Application Priority Data

Jun. 26, 2008   (JP) ................................ 2008-166842

(51) Int. Cl.
*H04J 14/00* (2006.01)
(52) U.S. Cl. ......... 398/195; 398/157; 398/160; 398/197
(58) Field of Classification Search .................. 398/157, 398/160, 195, 197
See application file for complete search history.

(56) References Cited

U.S. PATENT DOCUMENTS

| | | | |
|---|---|---|---|
| 2006/0082866 A1* | 4/2006 | Takahashi et al. | 359/334 |
| 2007/0019956 A1* | 1/2007 | Sorin et al. | 398/71 |
| 2007/0171514 A1* | 7/2007 | Rong et al. | 359/326 |

FOREIGN PATENT DOCUMENTS

| | | |
|---|---|---|
| JP | 2000-196536 A | 7/2000 |
| JP | 2003-143084 A | 5/2003 |
| JP | 2004-222304 A | 8/2004 |
| JP | 2004-289287 A | 10/2004 |
| JP | 2006-165651 A | 6/2006 |
| JP | 2006-197489 A | 7/2006 |
| JP | 2009-005065 A | 1/2009 |

OTHER PUBLICATIONS

N. Kashima et al., "Transient Properties of Side-Mode Injection Locking in an FPLD", Journal of Lightwave Technology, Mar. 2006, pp. 1523-1533, vol. 24, No. 3.
N. Kashima, "Dynamic Properties of FP-LD Transmitters Using Side-Mode Injection Locking for LANs and WDM-PONs", Journal of Lightwave Technology, Aug. 2006, pp. 3045-3058, vol. 24, No. 8.
L.Y. Chan et al., "Upstream traffic transmitter using injection-locked Fabry-Perot laser diode as modulator for WDM access networks", Electronic Letters, Jan. 3, 2002, pp. 43-45, vol. 38, No. 1.
H.D. Kim et al., "A Low-Cost WDM Source with an ASE Injected Fabry-Perot Semiconductor Laser", IEEE Photonics Technology Letters, Aug. 2000, pp. 1067-1069, vol. 12, No. 8.
Japanese Office Action dated May 29, 2012, issued in corresponding Japanese Patent Application No. 2008-166842, (English translation).

* cited by examiner

*Primary Examiner* — Danny Leung
(74) *Attorney, Agent, or Firm* — Westerman, Hattori, Daniels & Adrian, LLP

(57) ABSTRACT

An optical transmission system based on four-wave mixing and configured in a WDM-PON topology where a signal light between an optical line terminal and each of optical network units is multiplexed and demultiplexed at a WDM. The optical line terminal transmits downlink signal light having wavelengths $\lambda_{d1}, \ldots, \lambda_{dN}$ and pumping lights having wavelengths $\lambda_{p1}, \ldots, \lambda_{pN}$ which are different by a predetermined wavelength difference $\Delta\lambda$ from the wavelengths of the downlink signal lights. Each of the optical network units demultiplexes the downlink signal lights to receive a portion of the downlink signal lights, generates an uplink signal light to be transmitted from each of the optical network unit to the optical line terminal by using a portion of the downlink signal lights and the four-wave mixing from the pumping lights, and outputs a modulated uplink signal light.

8 Claims, 6 Drawing Sheets

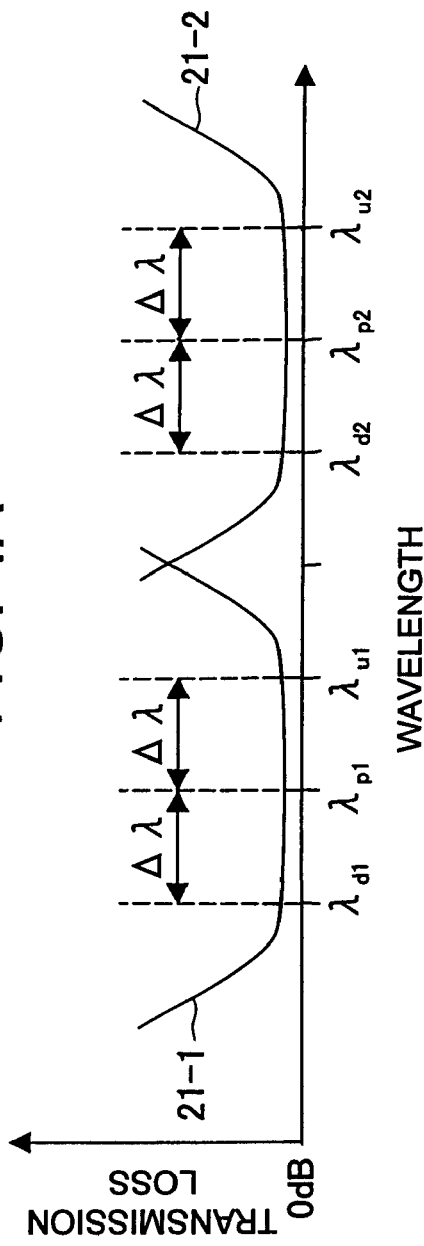 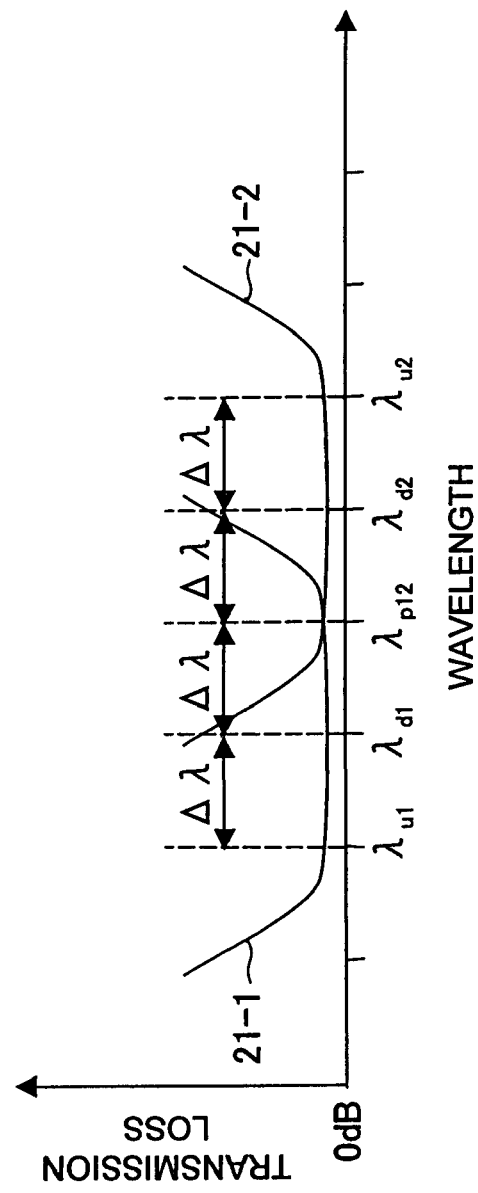

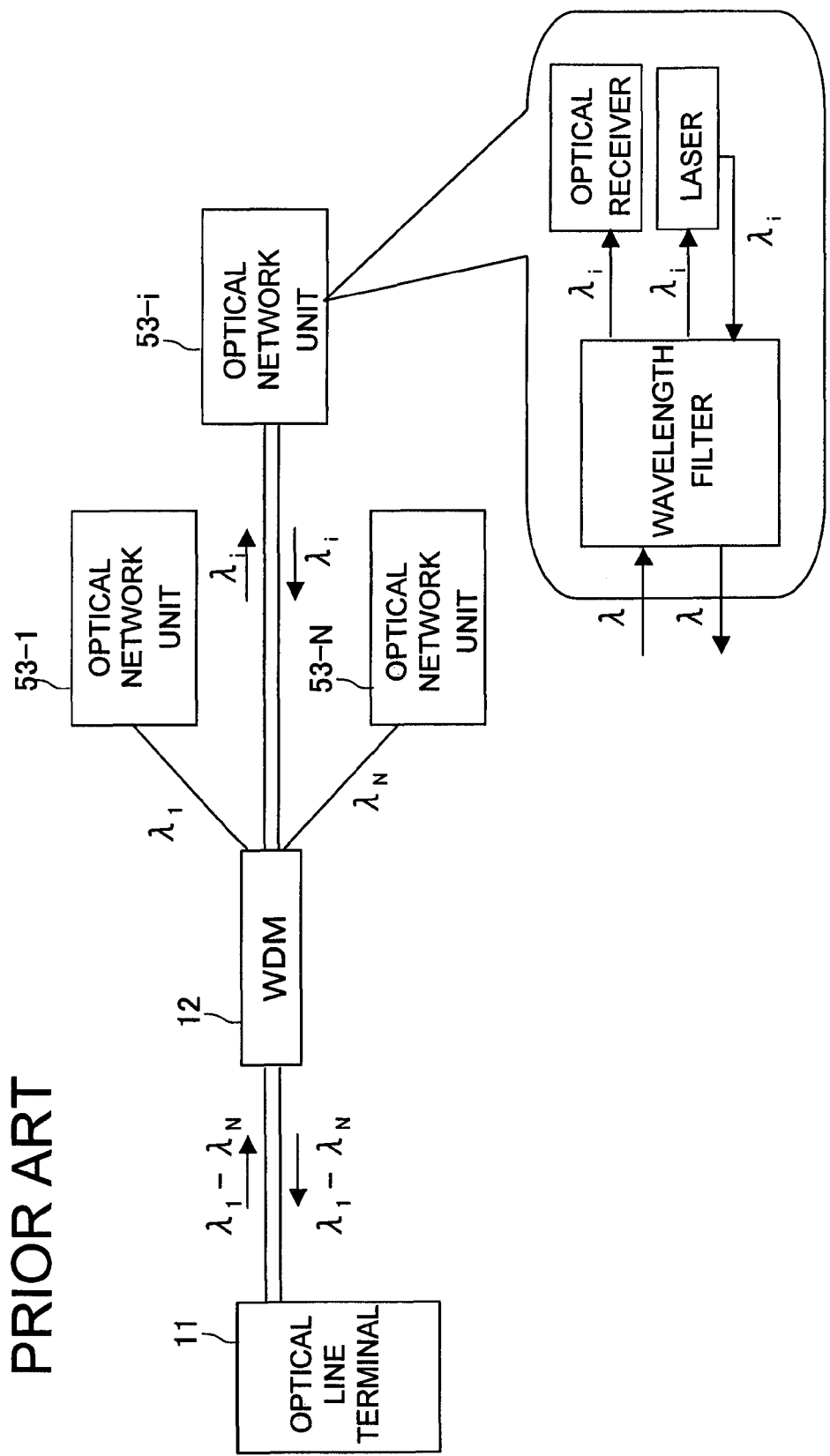

OPTICAL TRANSMISSION SYSTEM USING FOUR-WAVE MIXING

CROSS-REFERENCE TO RELATED APPLICATION

The present application is based on, and claims priority from, J.P. Application 2008-166842, filed Jun. 26, 2008, the disclosure of which is hereby incorporated by reference herein in its entirety.

BACKGROUND OF THE INVENTION

1. Technical Field

The present invention relates to a technology for configuring high-speed optical transmission and flexible network by using a WDM (wavelength division multiplexer) in an optical access network, and more particularly, to a WDM-PON (passive optical network) as one of the technologies for configuring an optical access network.

2. Background Art

Recently, technologies for configuring high-speed optical transmission and flexible network by using a WDM in an optical access network have been researched and developed in the world (For example, refer to Japanese Patent Application Laid-Open Publication No. 2004-222304). Among them, single longitudinal mode oscillation by performing injection locking in one of a plurality of longitudinal modes of an inexpensive FP-LD (Fabry-Perot Laser Diode) has been researched as one economical technology (For example, refer to N. Kashima and M. Watanabe, "Transient Properties of Side-Mode Injection Locking in an FPLD", IEEE/OSA, Journal of Lightwave Technology, Vol. 24, No. 3, pp. 1523-1533, March 2006, N. Kashima, "Dynamic Properties of FP-LD Transmitters Using Side-Mode Injection Locking for LANs and WDM-PONs", IEEE/OSA, Jounal of Lightwave Technology, Vol. 24, No. 8, pp. 3045-3058, August 2006, L. Y. Chan, et al., "Upstream traffic transmitter using injection-locked Fabry-Perot laser diode as modulator for WDM access networks", Electronics Letters, Vol. 38, No. 1, pp. 43-45, 3 Jan. 2002, and H. D. Kim, et al., "A Low-Cost WDM Source with an ASE Injected Fabry-Perot Semiconductor Laser", IEEE Photonics Technology Letters, Vol. 12, No. 8, pp. 1067-1069, August 2000).

FIG. 6 is a view illustrating a configuration of an example of a conventional optical transmission system. In the conventional method, since injected light (master light) is injection-locked in the FP-LD, a light having the same wavelength as the injected light is generated from the FP-LD. In such a method, a light having a wavelength $\lambda_i$ in a direction (hereinafter, referred to as a downward direction) from a central office apparatus (hereinafter, referred to as optical line terminal) 11 to a subscriber premises apparatus (hereinafter, referred to as optical network unit) 53-i (i is an integer of 1 to N) is transmitted. The light is firstly injection-locked in the FP-LD, and then, the light is reversely transmitted from the optical network unit 53-i to the optical line terminal 11. Therefore, the uplink and downlink wavelengths become equal to $\lambda_i$.

SUMMARY OF THE INVENTION

In the above documents, the wavelengths of the uplink and downlink signal light become equal to each other. Therefore, a PON topology where an optical fiber is branched at a WDM 12 is configured so as to perform bi-directional transmission between the optical network unit 53-i and the optical line terminal 11. For this reason, two optical fibers are needed. However, in terms of cost, it is desirable that the bi-directional transmission is implemented with one optical fiber.

Therefore, an object of the present invention is to provide an optical fiber capable of performing bi-directional transmission between an optical network unit and an optical line terminal by configuring a PON topology.

In order to achieve the above object, in an optical transmission system using four-wave mixing according to the present invention, a pumping light together with a downlink signal light is transmitted to each optical network unit, and each of the optical network units performs four-wave mixing to generate an uplink signal light.

More specifically, according to an aspect of the present invention, there is provided an optical transmission system using four-wave mixing, which is configured to have an optical line terminal, a plurality of optical network units connected to the optical line terminal through an optical fiber, and a WDM (wavelength division multiplexer) which multi/demultiplexes signal lights between the optical line terminal and the optical network units in a WDM-PON (passive optical network) topology, wherein the optical line terminal includes: a downlink signal transmitter which transmits downlink signal lights from the optical line terminal to the optical network units; and a pumping light source which supplies to the optical network units pumping lights having wavelengths which have a predetermined wavelength difference from wavelengths of the downlink signal lights, and wherein each of the optical network units includes: an optical receiver which receives a portion of the downlink signal lights from the optical line terminal; an FWM (Four Wave Mixing) generator which generates an uplink signal light to be transmitted from the subscriber side apparatus to the optical line terminal by using the four-wave mixing of another portion of the downlink signal lights transmitted from the optical line terminal and the pumping light; and a modulator which modulates the uplink signal light transmitted from the FWM generator and outputs the modulated uplink signal light to the optical line terminal.

Since each of the optical network units generates the uplink signal light by using the downlink signal lights and the pumping lights, all the same optical network units can be used. Since the uplink signal light is generated by using the four-wave mixing, the wavelengths of the downlink signal lights and the wavelengths of the uplink signal light can be designed to be different from each other. Accordingly, bi-directional transmission between the optical network units and the optical line terminal can be performed by configuring the PON topology, so that one optical fiber can be used. In addition, since the wavelengths of the uplink signal light can be defined by using the wavelengths of the downlink signal lights transmitted by the optical line terminal and the wavelengths of the pumping lights, it is possible to easily control the wavelengths.

In the above optical transmission system using four-wave mixing, the FWM generator is preferably constructed with a semiconductor amplifier, and the downlink signal lights and the pumping lights are input into the semiconductor amplifier in a gain saturated state thereof, so that the uplink signal lights can be generated by using the four-wave mixing.

Since the gain-saturated region of the semiconductor amplifier is used, it is possible to reduce influence on data values of the downlink signal lights. Accordingly, it is possible to improve transmission characteristics of the uplink signal lights.

In the above optical transmission system using four-wave mixing, the modulator is preferably constructed with an FP- LD (Fabry-Perot laser diode), and the uplink signal lights generated by using the four-wave mixing are input into the FP-LD to perform injection locked oscillation, so that the FP-LD can perform direct modulation.

Since the uplink signal lights are input into the FP-LD to perform the injection locked oscillation, it is possible to perform the direct modulation with the wavelengths of the uplink signal lights being maintained.

In the above optical transmission system using four-wave mixing, each of the optical network units preferably further includes an amplifier which amplifies the pumping light transmitted from the optical line terminal.

Accordingly, it is possible to increase intensities of the uplink signal lights with the wavelengths of the pumping light being maintained.

Effect of the Invention

According to the present invention, it is not necessary to provide light sources having different oscillation wavelengths to optical network units, so that it is possible to reduce cost. In addition, bi-directional transmission between the optical network units and an optical line terminal can be performed by configuring a PON topology, so that one optical fiber can be used.

BRIEF DESCRIPTION OF THE DRAWINGS

FIG. 4 illustrates an example of wavelengths of a downlink signal light, a pumping light, and an uplink signal light, (A) illustrates a case where the pumping light is transmitted with each downlink signal light, and (B) illustrates a case where a common pumping light is used.

FIG. 6 is a view illustrating a configuration of an example of a conventional optical transmission system.

DETAILED DESCRIPTION OF THE INVENTION

Hereinafter, embodiments of the present invention will be described in detail with reference to the accompanying drawings. The embodiments described below are exemplary configurations of the present invention, but the present invention is not limited thereto.

Figure 1:
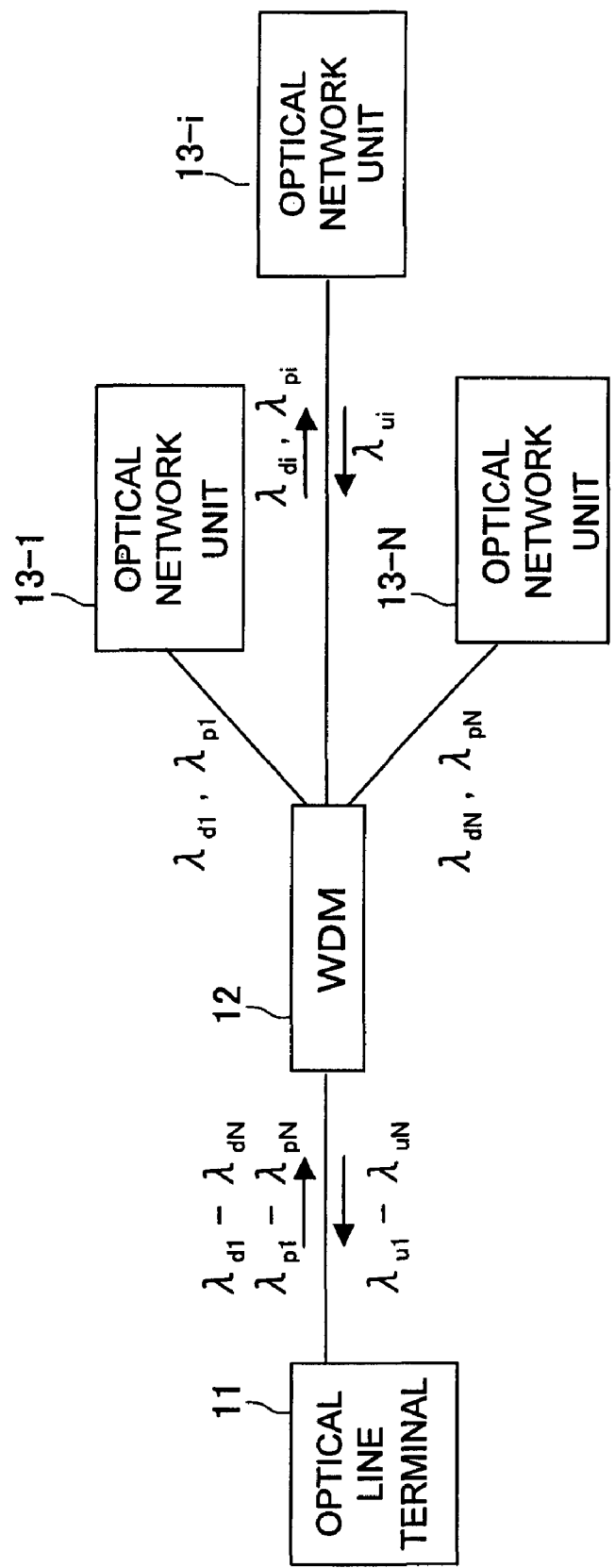
FIG. 1 is a schematic view illustrating a configuration of an optical transmission system using four-wave mixing according to an embodiment of the present invention.

FIG. 1 is a schematic view illustrating a configuration of an optical transmission system using four-wave mixing according to an embodiment of the present invention. The optical transmission system using four-wave mixing according to the embodiment is configured in a WDM-PON topology where a signal light between an optical line terminal 11 and each of optical network units 13-1, ..., 13-N is multi/demultiplexed at a WDM 12. An AWG (arrayed waveguide grating) may be used for the WDM 12.

The optical line terminal 11 includes a downlink signal transmitter and a pumping light source. The downlink signal transmitter transmits downlink signal lights having wavelengths $\lambda_{d1}, \ldots, \lambda_{dN}$ in a downlink direction to each of the optical network units 13-1, ..., 13-N. The pumping light source supplies pumping lights having wavelengths $\lambda_{p1}, \ldots, \lambda_{pN}$ which have a predetermined wavelength difference $\Delta\lambda$ from wavelengths of the downlink signal lights to the optical network units 13-1, ..., 13-N. Each of the optical network units 13-1, ..., 13-N receives a portion of the downlink signal lights from the WDM 12 and use four-wave mixing of another portion of the downlink signal lights and the pumping lights to generate uplink signal lights, which are to be modulated and transmitted from the optical network units 13-1, ..., 13-N to the optical line terminal 11.

Since each of the optical network units 13-1, ..., 13-N generates the uplink signal lights by using the downlink signal lights and the pumping lights, light sources are unnecessarily designed to have different oscillation wavelengths among each of the optical network units 13-1, ..., 13-N. Therefore, the PON topology can be configured with all the same optical network units 13-1, ..., 13-N, so that it is possible to reduce cost for performing bi-directional transmission between the optical network units 13-1, ..., 13-N and the optical line terminal 11. In addition, side band waves which generated by using the four-wave mixing are used as the uplink signal lights, so that the downlink signal lights and the uplink signal lights can be configured to have different wavelengths.

Figure 2:
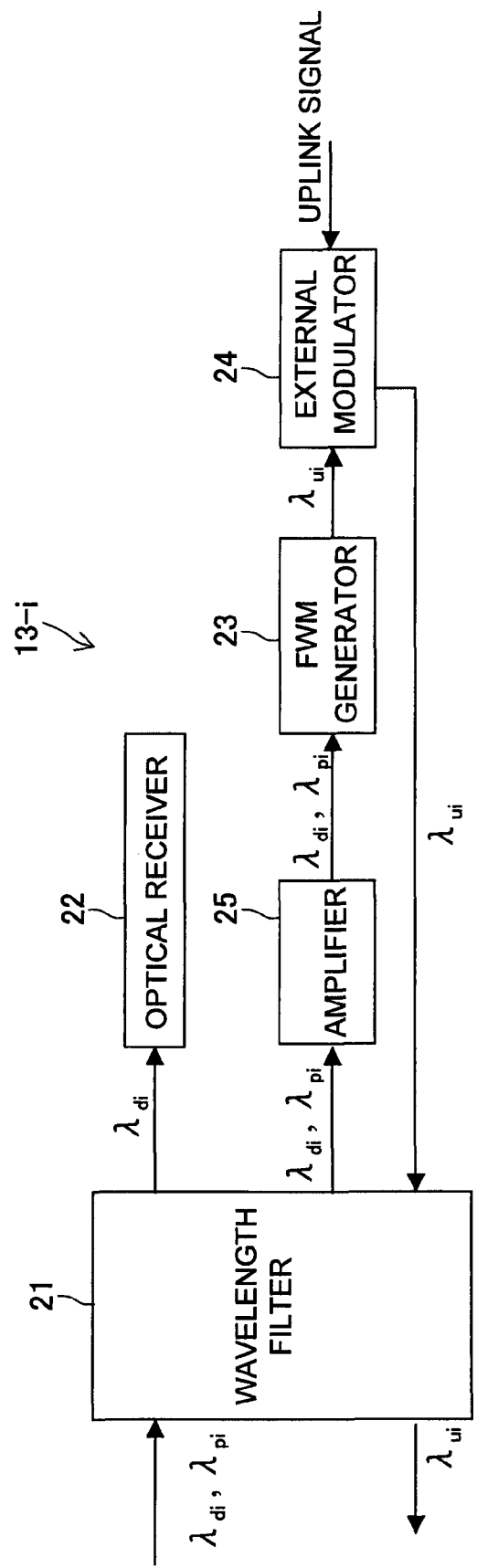
FIG. 2 is a pickup diagram illustrating a first example of an optical network unit.

FIG. 2 is a pickup diagram illustrating a first example of an optical network unit. An arbitrary optical network unit 13-i among the N optical network units 13-1, ..., 13-N includes a wavelength filter 21, an optical receiver 22, an FWM generator 23, and an external modulator 24 as a modulator.

The wavelength filter 21 demultiplexes and launches downlink signal lights having wavelengths $\lambda_{di}$ to the optical receiver 22. In addition, the wavelength filter 21 demultiplexes and launches pumping lights having wavelengths $\lambda_{pi}$ which have a predetermined wavelength difference AX from the wavelengths $\lambda_{pi}$ to the FWM generator 23. In a case where the wavelength filter 21 further includes an amplifier 25, the wavelength filter 21 launches the pumping lights having wavelengths $\lambda_{pi}$ which have a predetermined wavelength difference $\Delta\lambda$ from the wavelengths $\lambda_{di}$ to the amplifier 25. The wavelength filter 21 outputs to the optical line terminal 11 the uplink signal lights which are transmitted from the external modulator 24. The optical receiver 22 receives the downlink signal lights having wavelengths $\lambda_{di}$ which are demultiplexed at the wavelength filter 21.

The FWM generator 23 generates uplink signal lights having wavelengths $\lambda_{ui}$ by using the four-wave mixing of a portion of the downlink signal lights and the pumping lights. The four-wave mixing may be performed by a semiconductor amplifier or EDFA (erbium-doped fiber-optical amplifier) and a high-nonlinear fiber.

In the embodiment, a semiconductor amplifier is preferably used for the four-wave mixing in the FWM generator 23. Although the downlink signal lights are used for the four-wave mixing, intensities of the downlink signal lights are varied with data values of the downlink signal lights. Therefore, the downlink signal lights and the pumping lights are input into the semiconductor amplifier in a gain saturated state thereof, so that the uplink signal lights can be generated by using the four-wave mixing. Accordingly, an extinction ratio of each downlink signal light is degraded, so that it is possible to stabilize the intensities of the side band lights generated from the four-wave mixing.

In a case where the amplifier 25 which amplifies the pumping lights is further provided to a front stage of the FWM generator 23, the intensities of the side band waves generated from the FWM generator 23 can be increased. As a result, it is possible to increase the intensities of the uplink signal lights.

The external modulator 24 modulates the uplink signal light transmitted from the FWM generator 23 with an input uplink signal and transmits the modulated signal light. Therefore, single longitudinal mode oscillation is performed to generate wavelengths $\lambda_{ui}$ different from the wavelengths $\lambda_{di}$ of the downlink signal lights, so that the signal lights having the wavelengths $\lambda_{ui}$ can be used as the uplink signal lights. Since the wavelengths $\lambda_{di}$ of the downlink signal lights are different from the wavelengths $\lambda_{ui}$ of the uplink signal lights, it is possible to perform bi-directional transmission with one optical fiber, that is, uplink and downlink transmission without deterioration of characteristics. As an example of the external modulator 24, there are used a waveguide type modulator such as an LN (lithium niobate) modulator and an LT (lithium tantalate) modulator and an electric field absorption type modulator such as an electroabsorption modulator.

Figure 3:
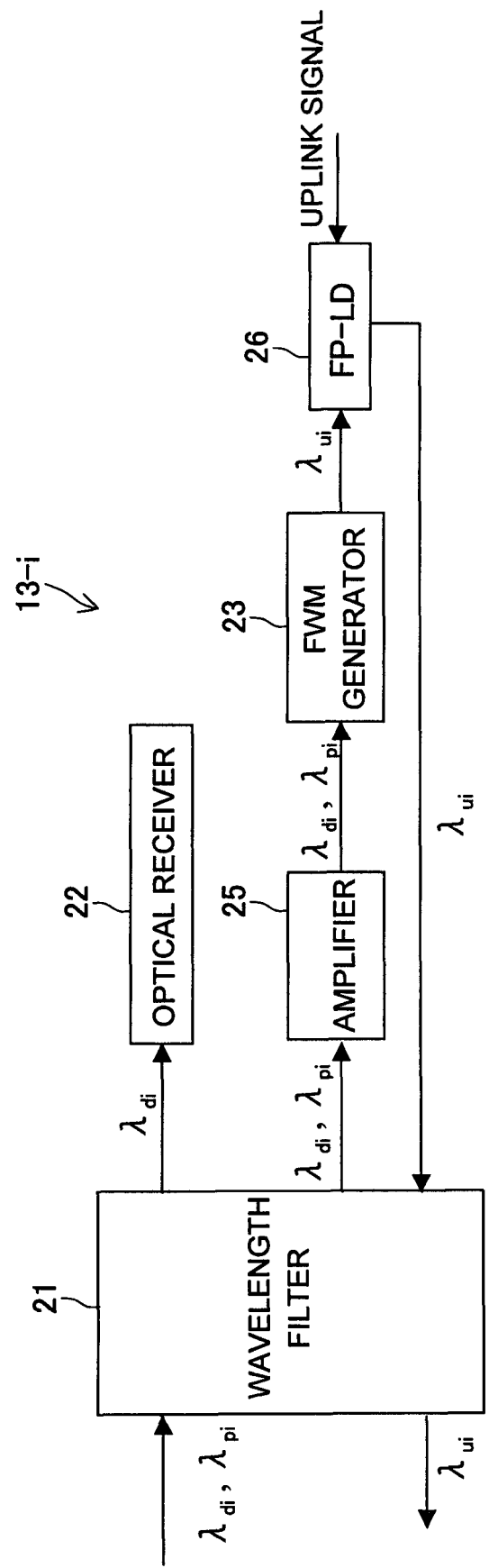
FIG. 3 is a pickup diagram illustrating a second example of the optical network unit.

FIG. 3 is a pickup diagram illustrating a second example of the optical network unit. Instead of the external modulator 24 described in the first example of the optical network unit, an FP-LD 26 is provided as a modulator. In this case, the FWM generator 23 performs injection locking by using the uplink signal light having wavelengths $\lambda_{ui}$ as a master light of the FP-LD 26.

The FP-LD 26 performs injection locked oscillation by inputting the uplink signal lights having wavelengths $\lambda_{ui}$ generated using the four-wave mixing into the FP-LD 26, so that the FP-LD 26 can perform direct modulation with an input uplink signal to transmit the modulated signal lights. Therefore, single longitudinal mode oscillation is performed with lights having wavelengths $\lambda_{ui}$ different from the wavelengths $\lambda_{di}$ of the downlink signal lights, so that the signal lights having wavelengths $\lambda_{ui}$ can be used as the uplink signal lights. In addition, since the wavelength $\lambda_{ui}$ of the side band wave is in the vicinity of the wavelength of each longitudinal mode (within a locking range), it is possible to implement the single longitudinal mode oscillation with the wavelengths $\lambda_{ui}$ of the uplink signal lights. Accordingly, it is possible to reduce cost.

The four-wave mixing in the FWM generator 23 is preferably performed by using a semiconductor amplifier. Accordingly, it is possible to improve injection locking characteristics in the FP-LD 26.

FIG. 4 illustrates an example of wavelengths of a downlink signal light, a pumping light, and an uplink signal light. In the figure, (A) illustrates a case where the pumping light is transmitted with each downlink signal light, and (B) illustrates a case where a common pumping light is used. FIG. 4 exemplarily illustrates the wavelength $\lambda_{d1}$ of the downlink signal light, the wavelength $\lambda_{u1}$ of the uplink signal light, and the wavelength $\lambda_{p1}$ of the pumping light used by an optical network unit 13-1 and the wavelength $\lambda_{d2}$ of the downlink signal light, the wavelength $\lambda_{u2}$ of the uplink signal light, and the wavelength $\lambda_{p2}$ of the pumping light used by the optical network unit 13-2. Transmission characteristics 21-1 and 21-2 are examples of transmission characteristics of the wavelength filters (21 in FIGS. 2 and 3) provided to the corresponding optical network units 13-1 and 13-2.

As the wavelengths $\lambda_{u1}$ and $\lambda_{u2}$ of the uplink signal lights, any wavelengths of long-wavelength-side or short-wavelength-side side band waves generated from the four-wave mixing is used. For example, as shown in (A) of FIG. 4, in a case where the pumping lights together with the downlink signal lights are transmitted, the long-wavelength-side side band waves can be used. In this case, a predetermined wavelength ($\lambda_{d1}+2\Delta\lambda$) can be derived from a predetermined wavelength difference $\Delta\lambda=(\lambda_{p1}-\lambda_{d1})$ with respect to the wavelength $\lambda_{d1}$ of the downlink signal light, and thus, the wavelength ($\lambda_{d1}+2\Delta\lambda$) can be used as the wavelength $\lambda_{u1}$ of the uplink signal light. Accordingly, it is possible to easily design and control the transmission characteristics 21-1 and 21-2.

Since any wavelengths of long-wavelength-side or short-wavelength-side side band waves can be used, it is possible to use a pumping light having a common wavelength $\lambda_{p12}$. For example, as shown in (B) of FIG. 4, wavelengths $\lambda_{u1}, \lambda_1, \lambda_{p12}, \lambda_{d2}, \lambda_{u2}$ can be sequentially disposed from the short-wavelength side. In this case, the wavelength filters (21 in FIGS. 2 and 3) is the transmission characteristics 21-1 and 21-2 and the wavelength $\lambda_{p12}$ of the pumping light is located in an overlapped portion between the transmission characteristics 21-1and 21-2. Alternatively, wavelengths $\lambda_{d2}, \lambda_{d1}, \lambda_{d12}, \lambda_{u1}, \lambda_{u2}$ may be disposed, so that the side band wave in the long-wavelength side can be used with a common pumping light. Since the pumping light having the common wavelength $\lambda_{d12}$ is used, a light source for the pumping light can be removed from the optical line terminal. Accordingly, it is possible to reduce cost.

The wavelength difference $\Delta\lambda$ between the $\lambda_{d1}$ of the downlink signal light and the $\lambda_{p1}$ of the pumping light is adjusted so that the $\lambda_{u1}$ of the uplink signal light is located in the vicinity of the wavelength of each longitudinal mode of the FP-LD 26 shown in FIG. 3 (within a lock-in range). As a result, the FP-LD performs the injection locking, so that single longitudinal mode oscillation can be performed with the $\lambda_{u1}$ of the uplink signal light. Therefore, since the wavelengths $\lambda_{d1}$ of the downlink signal light is different from the wavelength $\lambda_{u1}$ of the uplink signal light, it is possible to perform bi-directional transmission with good transmission characteristics by using one optical fiber.

Figure 5:
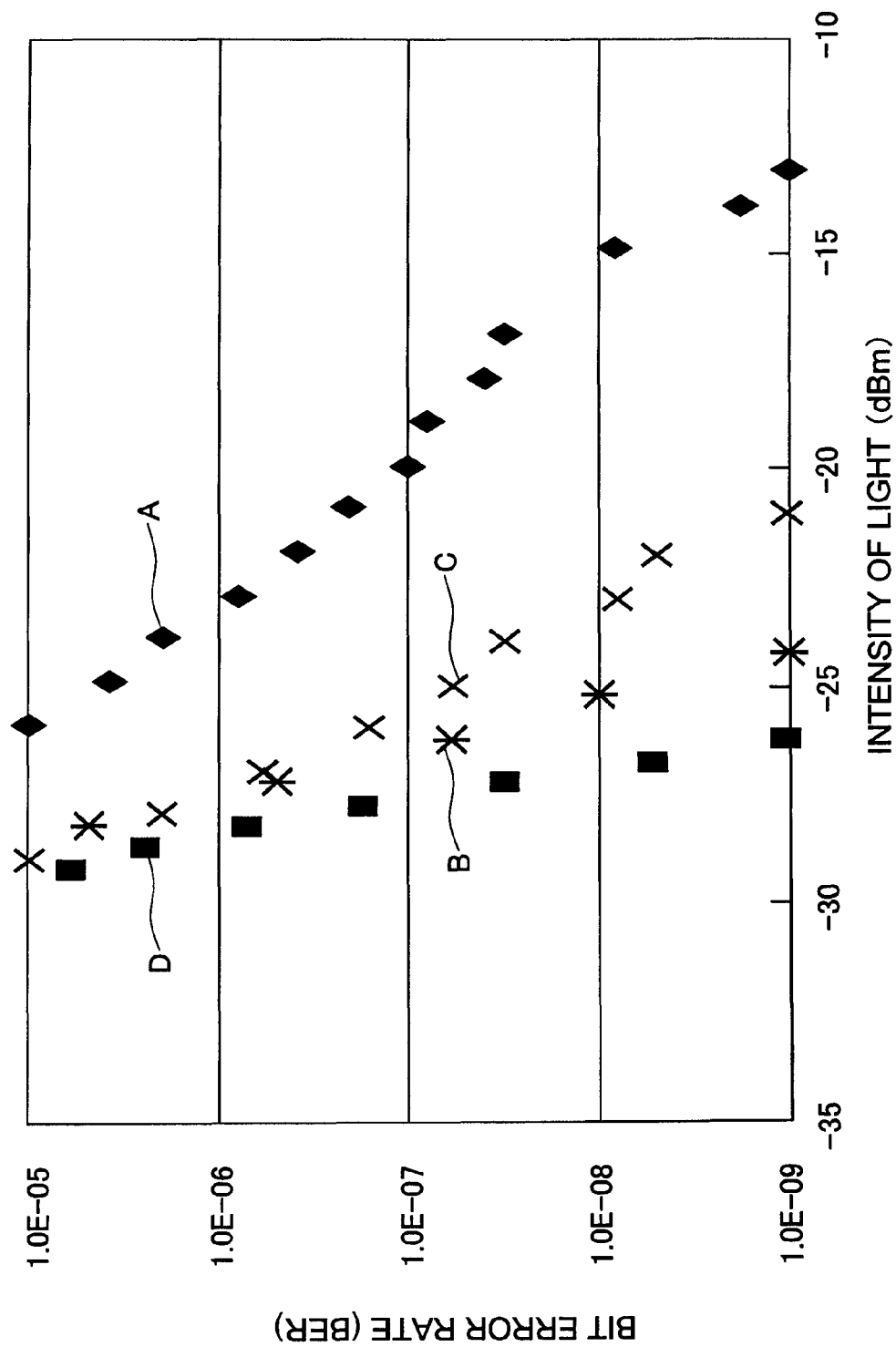
FIG. 5 is a view illustrating an example of a result of measurement of a transmission characteristic.

FIG. 5 is a view illustrating an example of a result of measurement of a transmission characteristic. After the output of the FP-LD 26 shown in FIG. 3, the uplink signal light is transmitted at 2.5 Gbps. Next, a received bit error rate (BER) as the characteristic is measured. The vertical axis is plotted with a bit error rate (BER), and the horizontal axis is plotted by an intensity (dBm) of a received light of the optical receiver (located in 11 in FIG. 1). Reference numeral A denotes a case where the extinction ratio of the downlink signal light input into the FWM generator (reference numeral 23 in FIG. 3) is 7 dB. Reference numeral B denotes a case where the extinction ratio of the downlink signal light input into the FWM generator (reference numeral 23 in FIG. 3) is 3.8 dB. Reference numeral C denotes a case where the extinction ratio of the downlink signal light input into the FWM generator (reference numeral 23 in FIG. 3) is 7 dB and the gain saturated region of the semiconductor amplifier is used. Reference numeral D denotes a case where the downlink signal light input into the FWM generator (reference numeral 23 in FIG. 3) is a non-modulated continuous light. Due to the injection locking with the data light, the extinction ratio of the downlink signal light is finite. However, for the reference, the continuous light is also denoted by reference numeral D.

In order to effectively receive the downlink signal light, it is desirable that the extinction ratio thereof is large. However, as indicated by reference numeral A with respect to reference numeral B, the transmission characteristic of the uplink signal light is deteriorated. On the other hand, as indicated by reference numeral C with respect to reference numeral A, since a semiconductor amplifier can be used as the FWM generator 23 shown in FIGS. 2 and 3, even in a case where the downlink signal light having a large extinction ratio is used, it is possible to improve the transmission characteristic of the uplink signal light.

According to the present invention, it is possible to configure high-speed optical transmission and flexible network. In particular, the present invention can be adapted to a WDM-PON as one of the methods of configuring an optical access network.

What is claimed is:

1. An optical transmission system based on four-wave mixing, comprising: an optical line terminal, a plurality of optical network units connected to the optical line terminal through an optical fiber, and a WDM (wavelength division multiplexer) which multiplexes and demultiplexes signal lights between the optical line terminal and the optical network units in a WDM-PON (passive optical network) topology,
wherein the optical line terminal comprises:
a downlink signal transmitter which transmits downlink signal lights from the optical line terminal to the optical network units; and
a pumping light source which supplies to the optical network units pumping lights having wavelengths which have a predetermined wavelength difference from wavelengths of the downlink signal lights, and
wherein each of the optical network units comprises:
an optical receiver which receives a portion of the downlink signal lights transmitted from the optical line terminal;
an FWM (Four Wave Mixing) generator which also receives said portion of the downlink signal lights transmitted from the optical line terminal, said FWM generator generates an uplink signal light and transmits the uplink signal light from the optical network unit to the optical line terminal based on the four-wave mixing of said portion of the downlink signal lights and the pumping light; and
a modulator which modulates the uplink signal light transmitted from the FWM generator and outputs the modulated uplink signal light to the optical line terminal.

2. The optical transmission system according to claim 1, wherein the FWM generator is constructed with a semiconductor amplifier, and the downlink signal lights and the pumping lights are input into the semiconductor amplifier in a gain saturated state thereof, so that the uplink signal lights are generated based on the four-wave mixing.

3. The optical transmission system according to claim 2, wherein the modulator is constructed with an FP-LD (Fabry-Perot laser diode), and the uplink signal lights generated based on the four-wave mixing are input into the FP-LD to perform injection locked oscillation, so that the FP-LD performs direct modulation.

4. The optical transmission system according to claim 3, wherein each of the optical network units further comprises an amplifier which amplifies the pumping light transmitted from the optical line terminal.

5. The optical transmission system according to claim 1, wherein the modulator is constructed with an FP-LD (Fabry-Perot laser diode), and the uplink signal lights generated based on the four-wave mixing are input into the FP-LD to perform injection locked oscillation, so that the FP-LD performs direct modulation.

6. The optical transmission system according to claims 1, wherein each of the optical network units further comprises an amplifier which amplifies the pumping light transmitted from the optical line terminal.

7. The optical transmission system according to claim 2, wherein each of the optical network units further comprises an amplifier which amplifies the pumping light transmitted from the optical line terminal.

8. The optical transmission system according to claim 5, wherein each of the optical network units further comprises an amplifier which amplifies the pumping light transmitted from the optical line terminal.

* * * * *